United States Patent
Wiggins et al.

(10) Patent No.: US 7,509,845 B2
(45) Date of Patent: Mar. 31, 2009

(54) THROTTLE INLET ABSOLUTE AIR PRESSURE SENSOR FOR DIRTY AIR FILTER DETECTION

(75) Inventors: Layne K. Wiggins, Plymouth, MI (US); Vivek Mehta, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 130 days.

(21) Appl. No.: 11/673,837

(22) Filed: Feb. 12, 2007

(65) Prior Publication Data

US 2008/0190177 A1    Aug. 14, 2008

(51) Int. Cl.
*G01M 15/00* (2006.01)
(52) U.S. Cl. .................................. 73/114.31
(58) Field of Classification Search ............. 73/114.31, 73/114.32, 114.33, 114.35, 114.36, 114.37
See application file for complete search history.

(56) References Cited

U.S. PATENT DOCUMENTS

| | | | | |
|---|---|---|---|---|
| 5,604,306 | A | * | 2/1997 | Schricker .................. 73/114.31 |
| 6,834,542 | B2 | * | 12/2004 | Aschner et al. .......... 73/114.33 |
| 2003/0221480 | A1 | * | 12/2003 | Aschner et al. ............ 73/118.1 |

* cited by examiner

*Primary Examiner*—Eric S McCall

(57) ABSTRACT

A system for detecting contamination of an air filter for an internal combustion engine includes an air pressure sensor disposed downstream of the air filter, an air flow sensor disposed in an air intake system of the engine, and a control module in communication with the air pressure sensor and the air flow sensor. The control module is configured to estimate an atmospheric pressure based on a signal received from the air pressure sensor. The control module is further configured to determine a contamination level of the air filter based on an air flow rate provided by the air flow sensor and a pressure drop across the air filter based on a pressure difference between the estimated atmospheric pressure and a second pressure measurement from the air pressure sensor that corresponds to the provided air flow rate.

19 Claims, 3 Drawing Sheets

THROTTLE INLET ABSOLUTE AIR PRESSURE SENSOR FOR DIRTY AIR FILTER DETECTION

FIELD

The present disclosure relates to internal combustion engine airflow, and more specifically to monitoring a contamination level of an engine air filter.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

An air filter is often used in an internal combustion engine to remove contamination from the induction air. Over a period of use the air filter can become plugged and restrict the air flow into the engine. This can reduce performance, reduce fuel economy and increase engine emissions. Therefore, it is important to determine whether air flow is restricted as a result of the air filter.

Traditional internal combustion engines include pressure sensors both upstream and downstream of the air filter. Accordingly, a traditional engine system is able to diagnose air flow restriction resulting from an air filter based on a calculated pressure drop across the air filter using the upstream and downstream pressure sensors. However, such additional hardware increases cost and manufacturing time, and is also a maintenance concern because proper operation of the sensors must be monitored and the sensors must be replaced if not functioning properly.

SUMMARY

Accordingly, a system for detecting contamination of an air filter for an internal combustion engine is provided. The system includes an air pressure sensor disposed downstream of the air filter, an air flow sensor disposed in an air intake system of the engine, and a control module in communication with the air pressure sensor and the air flow sensor. The control module is configured to estimate an atmospheric pressure based on a signal received from the air pressure sensor. The control module is further configured to determine a contamination level of the air filter based on an air flow rate provided by the air flow sensor and a pressure drop across the air filter based on a pressure difference between the estimated atmospheric pressure and a second pressure measurement from the air pressure sensor that corresponds to the provided air flow rate.

A method of determining a contamination level of an air filter in an internal combustion engine of a motor vehicle includes taking first and second air pressure measurements at a location downstream of the air filter. The first pressure measurement is taken at a first engine operating condition corresponding to a first engine air flow rate below a first limit. Atmospheric pressure is estimated based on the first air pressure measurement. The second air pressure measurement is taken at a second engine operating condition corresponding to a second engine air flow rate greater than a second limit. The second limit is substantially greater than the first limit. A pressure difference is determined between the first and second air pressure measurements. The pressure difference is compared to a predetermined pressure differential corresponding to the second air flow rate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
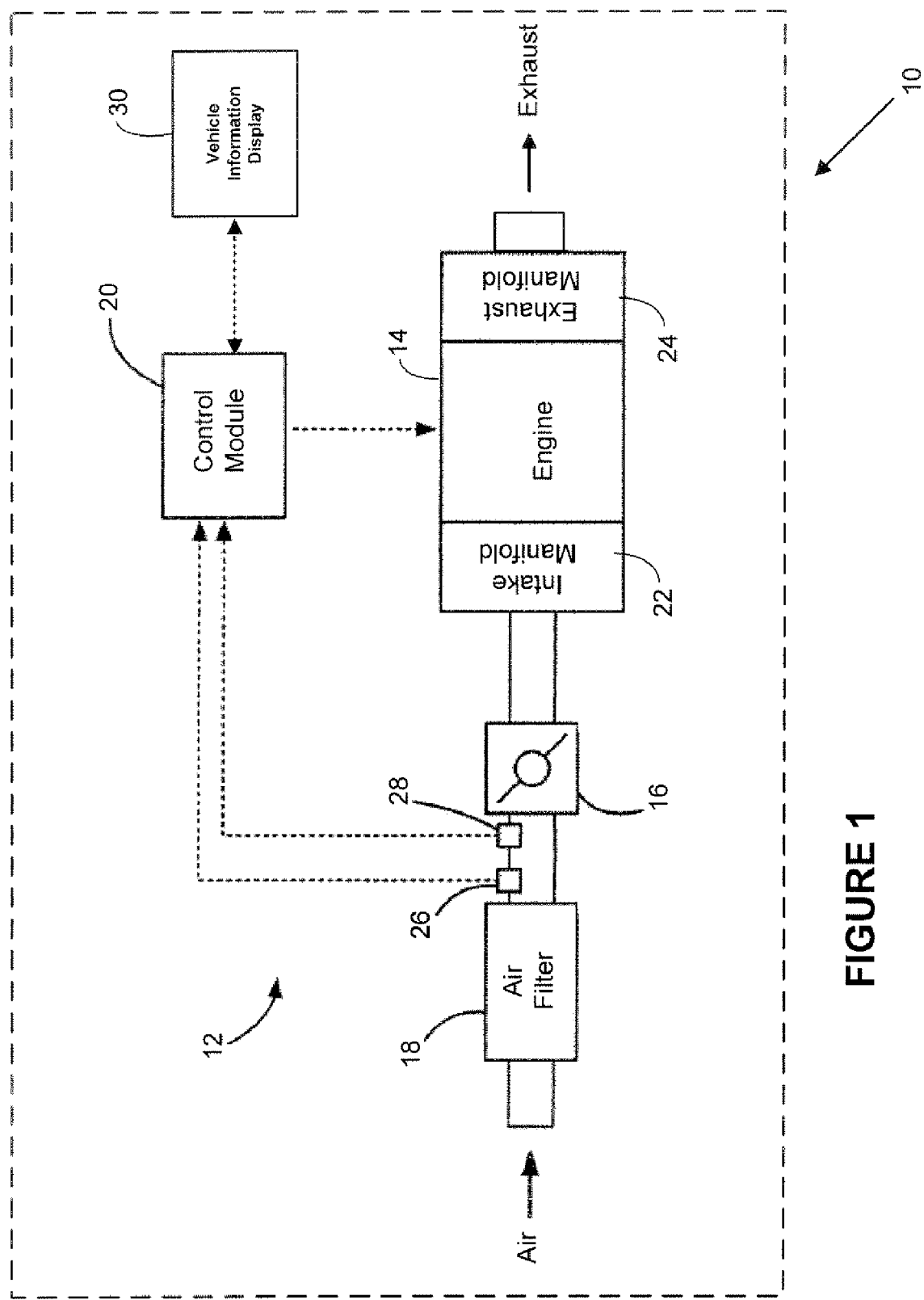
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

As seen in FIG. 1, a vehicle 10 is shown including an engine assembly 12. Engine assembly 12 may include an internal combustion engine 14, a throttle 16, an air filter 18, and a control module 20. Engine 14 may include intake and exhaust manifolds 22, 24. Intake manifold 22 may provide communication between a fresh air source and engine 14. Air filter 18 and throttle 16 may be disposed in the path of air entering intake manifold 22. More specifically, air flow may be metered by throttle 16 and may be required to flow through air filter 18 before entering intake manifold 22. A throttle inlet absolute pressure (TIAP) sensor 26 and a mass air flow (MAF) sensor 28 may be located downstream of air filter 18. More specifically, TIAP sensor 26 and MAF sensor 28 may be located between air filter 18 and throttle 16. A pressure sensor may not be required upstream of air filter 18, as discussed below.

TIAP sensor 26 may be in communication with control module 20 and may provide a signal indicative of an absolute air pressure downstream of air filter 18. MAF sensor 28 may also be in communication with control module 20 and may provide a signal indicative of a mass air flow rate through air filter 18 and into engine 14. Control module 20 may also be in communication with engine 14, providing and receiving signals regarding operation of engine 14. A vehicle information display 30 may be in communication with control module 20, providing and receiving signals regarding conditions of vehicle 10.

Figure 2:
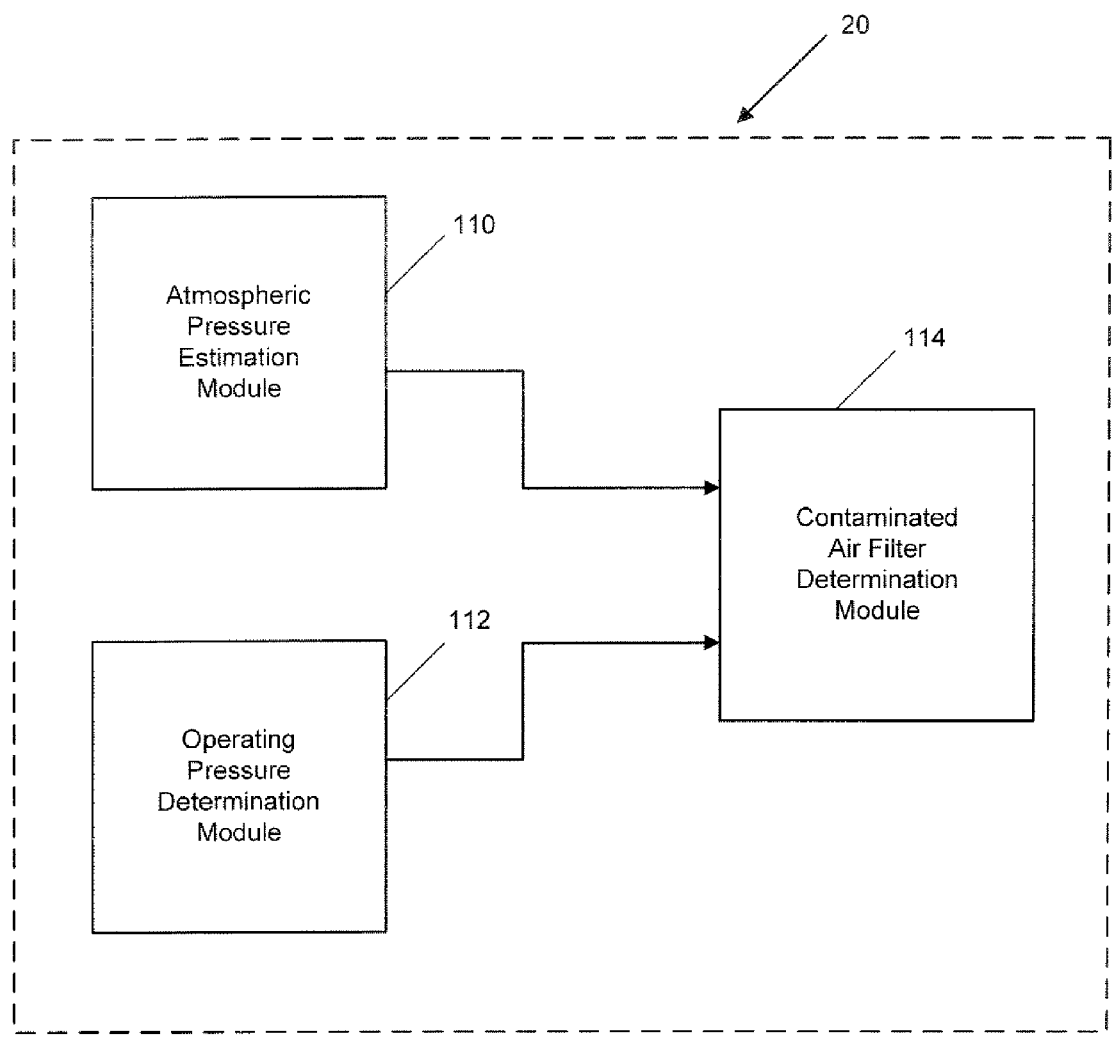
FIG. 2 is a functional block diagram of the control module shown in FIG. 1.

Referring to FIG. 2, control module 20 may include an atmospheric pressure estimation module 110, an operating pressure determination module 112, and a contaminated air filter determination module 114. Atmospheric pressure estimation module 110 may estimate atmospheric pressure based on a pressure measurement from TIAP sensor 26 at a first low air flow rate into engine 14, and therefore through air filter 18, as discussed below. Atmospheric pressure estimation module 110 may provide the estimated atmospheric pressure to contaminated air filter determination module 114.

Operating pressure determination module 112 may determine an operating pressure based on a pressure measurement from TIAP sensor 26 at a second air flow rate determined by MAF sensor 28 into engine 14, and therefore through air filter 18, as discussed below. Operating pressure determination module 112 may provide the operating pressure and second air flow rate to contaminated air filter determination module 114. Contaminated air filter determination module 114 may then determine the pressure difference between the estimated atmospheric pressure and the operating pressure and determine if the pressure differential is indicative of a contaminated (or dirty) air filter at the second air flow rate, as discussed below.

Figure 3:
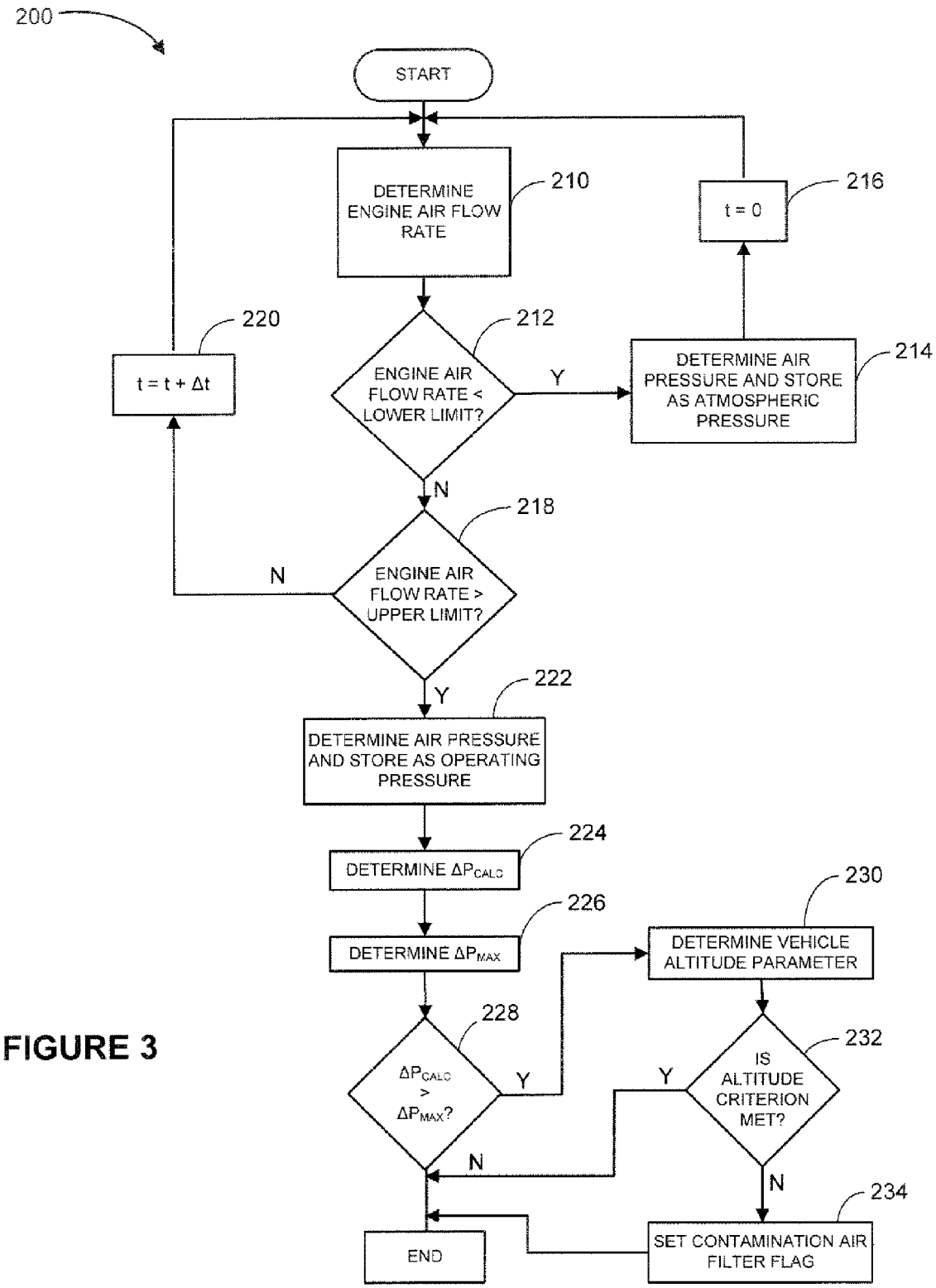
FIG. 3 is a flow chart illustrating a method of detecting a contaminated air filter according to the present disclosure.

A flow chart is shown in FIG. 3 illustrating the control logic 200 for determining air filter contamination. Control logic 200 may run repeatedly during vehicle operation at a predetermined time step ($\Delta t$). Each new run of control logic 200 may include resetting a time counter (t). Time counter (t) may be used for vehicle altitude considerations, as discussed below. Control logic 200 may begin by measuring a mass air flow rate through air filter 18 using MAF sensor 28 at control block 210. Control logic 200 may then proceed to determination block 212 where the measured mass air flow rate is compared to a lower limit. The lower limit may generally correspond to a flow rate providing a minimal pressure drop across air filter 18. The flow rate lower limit may vary by filter type, but may generally be associated with an engine air flow rate that is less than ten percent of a maximum engine air flow rate.

If the mass air flow rate is less than the lower limit, control logic 200 proceeds to control block 214. Control block 214 determines the absolute air pressure corresponding to the measured mass air flow rate. The air pressure may be measured by TIAP sensor 26 and may be stored in control module 20 as an estimated atmospheric pressure. Control logic 200 may then proceed to control block 216 where time counter (t) is reset. Control logic 200 may wait a predetermined time step ($\Delta t$) and then once again proceed to control block 210. If determination block 212 determines that the measured mass air flow rate is greater than the lower limit, control logic 200 proceeds to determination block 218.

Determination block 218 compares the measured mass air flow rate to an upper limit. The upper limit may generally correspond to a flow rate providing a significant pressure drop across air filter 18. The flow rate upper limit may vary by filter type, but may generally be associated with an engine air flow rate that is greater than thirty percent of a maximum engine air flow rate. If the mass air flow rate is less than the upper limit, control logic 200 may proceed to control block 220 where time counter (t) is increased by a predetermined time step ($\Delta t$). Control logic 200 may wait a predetermined time step ($\Delta t$) and then once again proceed to control block 210. If determination block 218 determines that the measured mass air flow rate is greater than the upper limit, control logic 200 proceeds to control block 222.

Control block 222 determines the absolute air pressure corresponding to the measured mass air flow rate. The air pressure may be measured by TIAP sensor 26 and may be stored in control module 20 as an operating pressure. Control logic 200 then proceeds to control block 224 where a pressure differential is determined. More specifically, control block 224 may calculate the pressure difference between the operating pressure and the estimated atmospheric pressure indicative of a pressure drop across air filter 18. This calculated pressure drop may generally correspond to the measured mass air flow rate associated with the operating pressure. Control logic 200 then proceeds to control bock 226.

Control block 226 determines a maximum allowable pressure drop across air filter 18. A predetermined value for a maximum allowable pressure drop indicative of a contaminated (or dirty) air filter is determined for a flow rate corresponding to the measured mass flow rate associated with the operating pressure. The maximum allowable pressure drop may be determined using a look-up table or a predetermined function based on the measured mass flow rate associated with the operating pressure. After the maximum allowable pressure drop is determined, control logic 200 proceeds to determination block 228.

Determination block 228 compares the calculated pressure drop to the maximum allowable pressure drop. If the calculated pressure drop is less than or equal to the maximum allowable pressure drop, control logic 200 ends until the next iteration at a subsequent time step. If calculated pressure drop is greater than the maximum allowable pressure drop, control logic 200 may then proceed to control block 230 where a determination is made regarding whether the calculated pressure drop could be attributable to a change in vehicle altitude.

Control block 230 may determine a vehicle altitude parameter. More specifically, control block 230 may determine an elapsed time between the stored atmospheric pressure measurement and the current operating pressure measurement based on time counter (t). The elapsed time may be used by itself or the elapsed time could be used to estimate a distance traveled over the elapsed time. The elapsed time may be indicative of an altitude change in vehicle 10 between measurements, which may contribute to an increased pressure drop across air filter 18. Control logic 200 may then proceed to determination block 232.

Determination block 232 evaluates the altitude parameter and determines if an altitude criterion is met. More specifically, determination block 232 may compare the elapsed time or distance traveled, as determined above, to a predetermined value. If the elapsed time or distance exceeds the predetermined limit, the calculated pressure drop may be attributable to a change in altitude of vehicle 10. Therefore, if the altitude parameter exceeds the altitude criterion control logic 200 ends until the next iteration at a subsequent time step so that a false contaminated air filter flag is not set.

If the altitude parameter does not exceed the altitude criterion control logic 200 proceeds to control block 234 where a contaminated air filter flag is set. Control block 234 may indicate a contaminated air filter condition on vehicle information display 30. After control block 234, control logic 200 may end until the next iteration at a subsequent time step.

As indicated in control logic 200 and shown in vehicle 10, contamination of air filter 18 may be determined based on measuring first and second absolute air pressures downstream of air filter 18 using TIAP sensor 26. More specifically, the pressure drop across air filter 18 may be determined without the use of an air pressure sensor upstream of air filter 18.

An example of control logic 200 applied to operation of vehicle 10 of the present disclosure may include vehicle 10 being initially in a stopped condition. When in the stopped condition engine 14 may be operating at an idle condition. This vehicle stopped engine idle condition generally corresponds to a low mass air flow rate into engine 14, and therefore through air filter 18. A first pressure measurement may be taken by TIAP sensor 26 at this condition. As this condition is associated with a low mass air flow rate, the pressure measurement may be used as an estimated atmospheric pressure.

When vehicle 10 accelerates from the stopped condition, the mass air flow into engine 14, and therefore through air filter 18, may significantly increase. When accelerating, an air flow measurement may be made using MAF sensor 28. A second pressure measurement may then be taken using TIAP sensor 26 generally corresponding to the measured mass air flow rate. The difference between the first and second pressures may be calculated and compared to a predetermined value to determine air filter contamination, as indicated above.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:
taking a first air pressure measurement at a location downstream of an air filter in an intake system for an internal combustion engine of a motor vehicle at a first engine operating condition corresponding to a first engine air flow rate below a first limit;
estimating an atmospheric pressure based on the first pressure measurement;
taking a second air pressure measurement after the first air pressure measurement at a location downstream of the air filter at a second engine operating condition corresponding to a second engine air flow rate greater than a second limit, wherein the second limit is greater than the first limit;
determining the difference between the first and second air pressure measurements;
determining whether the pressure difference between the first and second air pressure measurements exceeds a predetermined pressure differential associated with the second air flow rate; and
determining an elapsed time between the first and second air pressure measurements when the pressure difference between first and second air pressure measurements exceeds the predetermined pressure differential.

2. The method of claim 1, further comprising measuring an air flow rate to the engine and determining whether the measured air flow rate is less than the first limit.

3. The method of claim 2, wherein the first air pressure measurement is taken when the measured air flow rate is less than the first limit.

4. The method of claim 1, further comprising measuring an air flow rate to the engine and determining whether the measured air flow rate is greater than the second limit.

5. The method of claim 4, wherein the second air pressure measurement is taken when the measured air flow rate is greater than the second limit.

6. The method of claim 4, further comprising waiting a predetermined time when the measured air flow rate is below the second limit and then again measuring an air flow rate to the engine and determining whether the measured air flow rate is greater than the second limit.

7. The method of claim 1, further comprising determining whether the elapsed time indicates a vehicle operating parameter exceeding a predetermined limit associated with a change in vehicle altitude.

8. The method of claim 7, wherein the vehicle operating parameter corresponds to a distance traveled by the vehicle over the elapsed time.

9. The method of claim 7, further comprising indicating that the air filter is contaminated when the predetermined limit is not exceeded and not indicating that the air filter is contaminated when the predetermined limit is exceeded.

10. The method of claim 1, wherein said determining a contamination level of the air filter does not include taking an air pressure measurement at a location upstream of the air filter.

11. A control module comprising:
an atmospheric pressure estimation module configured to estimate an atmospheric pressure based on a first pressure measurement received from an air pressure sensor disposed downstream of an air filter for an internal combustion engine;
an operating pressure determination module configured to determine an operating pressure based on a second pressure measurement received from the air pressure sensor corresponding to a measured air flow rate through the air filter; and
a contaminated air filter determination module configured to determine a pressure drop across the air filter corresponding to the measured air flow rate based on a difference between the first and second pressure measurements, the contaminated air filter determination module being configured to determine an elapsed time between the first and second pressure measurements when the difference between the first and second air pressure measurements exceeds a predetermined pressure differential.

12. The control module of claim 11, wherein said control module does not receive an air pressure measurement from a location upstream of the air filter.

13. The control module of claim 11, wherein said atmospheric pressure estimation module is configured to determine a low engine air flow condition.

14. The control module of claim 13, wherein said atmospheric pressure estimation module is configured to estimate the atmospheric pressure based on an air pressure signal from said air pressure sensor at the low engine air flow condition.

15. The control module of claim 13, wherein said atmospheric pressure estimation module determines the low engine air flow condition based on another measured air flow rate.

16. The control module of claim 11, wherein said operating pressure determination module is configured to determine an operating engine air flow condition.

17. The control module of claim 16, wherein said operating pressure determination module is configured to determine the operating pressure based on the second pressure measurement from said air pressure sensor at the operating engine airflow condition.

18. The control module of claim 16, wherein said operating pressure determination module determines the operating engine air flow condition based on the measured air flow rate.

19. A method comprising:
taking a first air pressure measurement at a location downstream of an air filter in an intake system for an internal combustion engine of a motor vehicle at a first engine operating condition corresponding to a first engine air flow rate below a first limit;
estimating an atmospheric pressure based on the first pressure measurement;

measuring an air flow rate to the engine and determining whether the measured air flow rate is greater than a second limit;

waiting a predetermined time when the measured air flow rate is below the second limit and then again measuring an air flow rate to the engine and determining whether the measured air flow rate is greater than the second limit;

taking a second air pressure measurement after the first air pressure measurement at a location downstream of the air filter at a second engine operating condition when the measured air flow rate is greater than a the second limit, wherein the second limit is greater than the first limit;

determining the difference between the first and second air pressure measurements; and determining whether the pressure difference between the first and second air pressure measurements exceeds a predetermined pressure differential associated with the second air flow rate.

* * * * *